United States Patent [19]

Douglas

[11] Patent Number: 5,086,911
[45] Date of Patent: Feb. 11, 1992

[54] FOLDABLE FRAMEWORK FOR BELT CONVEYORS

[75] Inventor: Patrick J. Douglas, Santon, Great Britain

[73] Assignee: Extec Screens and Crushers Limited, Sheffield, United Kingdom

[21] Appl. No.: 576,474

[22] PCT Filed: Jan. 25, 1990

[86] PCT No.: PCT/GB90/00104
§ 371 Date: Oct. 1, 1990
§ 102(e) Date: Oct. 1, 1990

[87] PCT Pub. No.: WO90/08720
PCT Pub. Date: Aug. 9, 1990

[30] Foreign Application Priority Data

Feb. 1, 1989 [GB] United Kingdom ............... 8902152

[51] Int. Cl.$^5$ .............................................. B65G 21/10
[52] U.S. Cl. ........................................ 198/632; 198/313; 198/861.3
[58] Field of Search .................. 198/313, 632, 861.3

[56] References Cited

U.S. PATENT DOCUMENTS

| 275,453 | 4/1883 | Anderson | 198/632 |
|---|---|---|---|
| 311,137 | 1/1885 | Miller | 198/632 |
| 311,317 | 1/1885 | Hasselman | 198/632 |
| 1,441,851 | 1/1923 | Hartley | 198/632 |
| 3,051,295 | 8/1962 | Moy | 198/313 |
| 4,591,432 | 5/1986 | Hartl | 198/313 X |
| 5,044,484 | 9/1991 | Douglas | 198/632 |

FOREIGN PATENT DOCUMENTS 0338752 10/1989 European Pat. Off. .
1271008 4/1972 United Kingdom .
2200613 8/1988 United Kingdom .

Primary Examiner—Joseph E. Valenza
Attorney, Agent, or Firm—Merchant & Gould Smith, Edell, Welter & Schmidt

[57] ABSTRACT

There is disclosed an endless conveyor having a foldable framework and comprising a supporting structure (3), a tail conveyor framework (1) which is hingedly connected at one end (2) to the supporting structure (3), a head conveyor framework (6) is hingedly connected to the other end (5) of the tail conveyor framework (1), the tail and head conveyor drums (4, 7) mounted on tail and head conveyor frameworks respectively and around which an endless belt (8) is taken, and at least one supporting link (10) hingedly connected at one end (11) to the supporting structure (3) and at the other end (9) to the head conveyor framework (6) at a point adjacent to the hinged connection (5) of the tail conveyor framework (1) to the head conveyor framework (6). The arrangement of the supporting structure (3), the tail conveyor framework (1), the head conveyor framework (6) and the supporting link (10) is such that they form a four-bar-type linkage having proportions such that when the two conveyor frameworks (1, 6) are aligned end to end, they are constrained to slope upwardly, and an actuator is coupled with the four-bar linkage and is operable to alter the angular relationships between adjacent members of the linkage in order to adjust the foldable structure between an operative condition of the endless conveyor and a folded inoperative position suitable for transport of the endless conveyor.

5 Claims, 2 Drawing Sheets

FOLDABLE FRAMEWORK FOR BELT CONVEYORS

The present invention concerns a linkage arrangement for a foldable framework which is inteded for use with troughed-belt conveyors.

Troughed-belt conveyors are commonly used to transport and to elevate bulk materials such as coal, soil, gravel and mineral ores, and the plant used for processing such bulk materials commonly incorporates such troughed-belt conveyors. When a processing plant which contains one or more troughed-belt conveyors is intended to be capable of being readily movable from place to place either upon a site or between different sites, it is frequently found that size of the conveyors renders the plant unwieldy and difficult or impossible to move, especially if the plant is to be moved along public roads where there are legal limitations to the maximum overall dimensions of vehicles. Accordingly, there is a need for types of troughed-belt conveyor which are readily foldable.

Hitherto, manufacturers of portable processing plant have used various means for constructing foldable frameworks for troughed-belt conveyors, each more or less suited to the particular item of plant into which it was intended to be incorporated, and typically employing a telescopic or a hinged portion or a means for folding the conveyor sideways. However, such conveyors are often awkward or dangerous to fold and deploy, and they frequently require assistance from a loading shovel or a crane.

It is an object of the present invention to provide a foldable framework for a troughed-belt conveyor which is exceptionally simple and safe to fold and to deploy.

It is a second object of the invention to provide a foldable framework which does not necessarily require assistance from an operative or an external lifting means when folding or deploying.

According to the invention there is provided an endless conveyor having a foldable framework and which comprises:

a supporting structure;

a tail conveyor framework which is hingedly connected at one end to the supporting structure;

a head conveyor framework hingedly connected to the other end of the tail conveyor framework;

tail and head conveyor drums mounted on the tail and head conveyor frameworks respectively, and around which an endless belt is taken; and, at least one supporting link hingedly connected at one end to the supporting structure and at its other end to the head conveyor framework at a point adjacent to the hinged connection of the tail conveyor framework to the head conveyor framework;

in which the supporting structure, the tail conveyor framework, the head conveyor framework and the supporting link form a four-bar type linkage having proportions arranged so that when the two conveyor frameworks are aligned end-to-end, they are constrained to slope upwardly; and an actuator is coupled with the linkage and is operable to alter the angular relationships between adjacent members of the linkage in order to adjust the foldable structure between an operative condition of the endless conveyor and a folded inoperative position suitable for transport of the endless conveyor.

Preferably, the arrangement is such that the tail conveyor framework and the head conveyor framework slope upwardly at an angle of between 10° and 30° to the horizontal when in the operative position.

The supporting link which is hingedly connected at one end to the supporting framework and at its other end to the head conveyor framework may be arranged to operate as a compression strut or as a tensile tie, depending upon whether its mounting on the supporting structure is below or above the hinged connection of the tail conveyor framework to the supporting structure respectively.

Conveniently, the endless belt which is taken around the tail and head conveyor drums is of a type suitable to enable the endless conveyor of the invention to operate as a "troughed-belt" conveyor.

The invention will be more clearly understood by reference to the following descriptions of embodiments thereof, given by way of example only and without prejudice to the invention, and to the following illustrations wherein.

Figure 1:
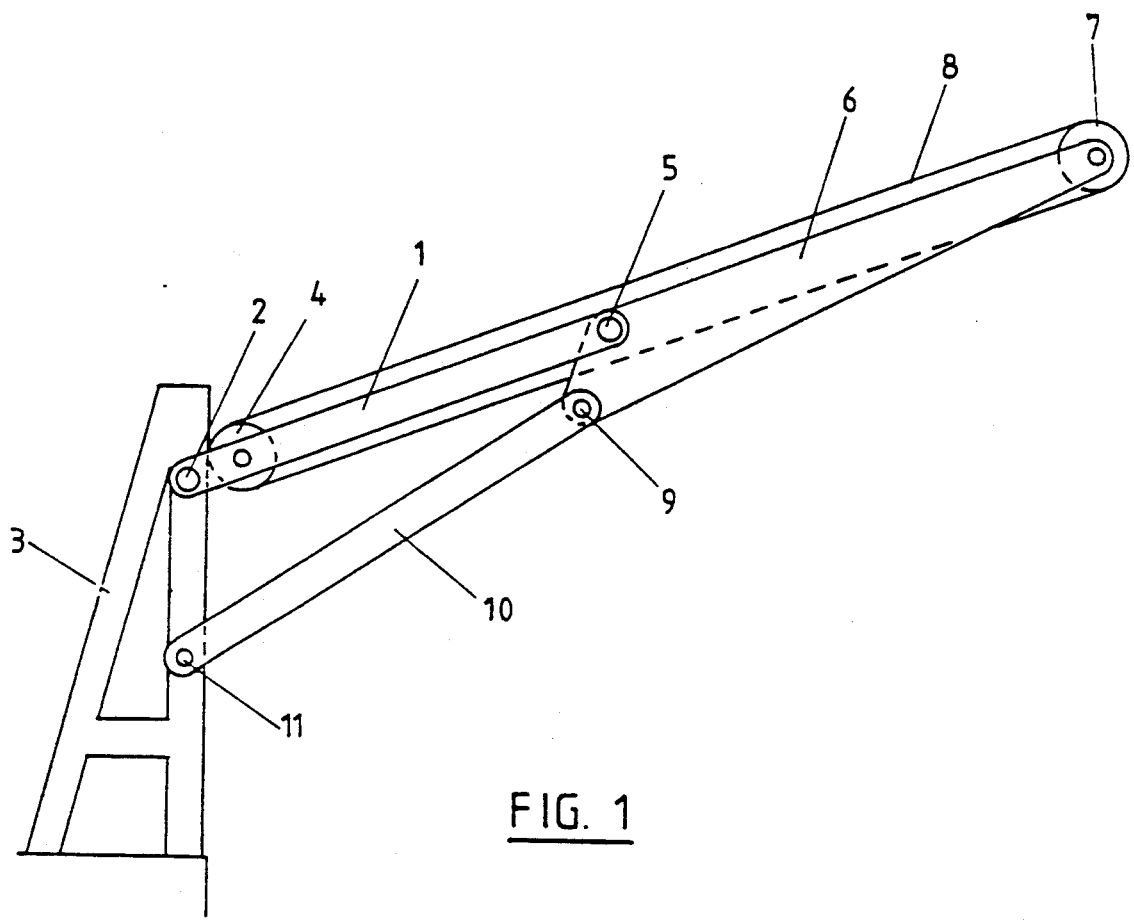
FIG. 1 shows schematically a first embodiment of foldable framework for a troughed-belt conveyor constructed according to the invention in its working position.

Referring now to FIG. 1, there is provided a tail conveyor frame 1 which is connected at its tail end by means of a pivot 2 to a supporting structure 3, and upon which is mounted a conveyor tail drum 4, and which at its head end is connected by means of pivot 5 to a head conveyor frame 6. The head conveyor frame 6 carries at its head end a conveyor head drum 7 which in turn supports and provides a driving means for a conveyor belt 8, and adjacent to its tail end it is connected by means of pivot(s) 9 to the outermost end(s) of supporting link(s) 10 which is/are located in this example beneath the conveyor. The supporting link(s) 10 is/are connected at its/their innermost end(s) to the supporting frame 3 by means of the pivot(s) 11.

The relative lengths of the links and frames, and the distances between the pivots are so arranged that when the two conveyor frames 1 and 6 are aligned end-to-end in a straight line (by means of an actuator such as an hydraulic cylinder or cylinders not shown), they slope upwardly at a predetermined angle which is typically between 10° and 30° above the horizontal.

Figure 2:
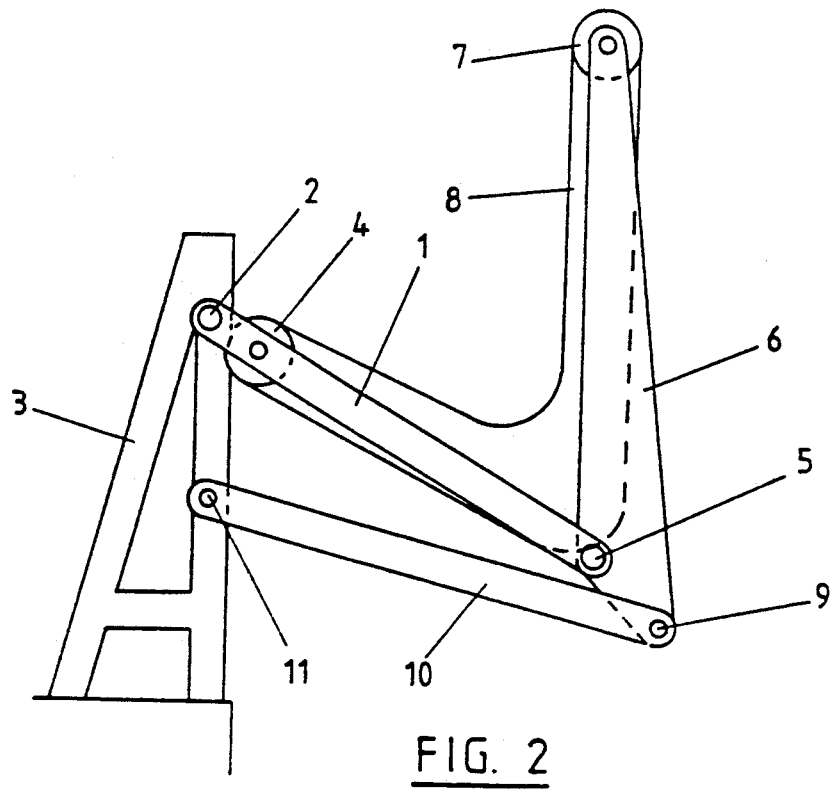
FIG. 2 shows the same foldable framework in its folded position.

Referring now to FIG. 2, the same conveyor is shown in its folded position, where it is seen that the tail conveyor frame 1 has been moved (by means of the actuator not shown) to a downwardly sloping attitude whilst the head conveyor frame 6 has been constrained by the link(s) 10 to move to a substantially upright attitude. The conveyor belt 8 hangs loosely over the drums 4 and 7.

Figure 3:
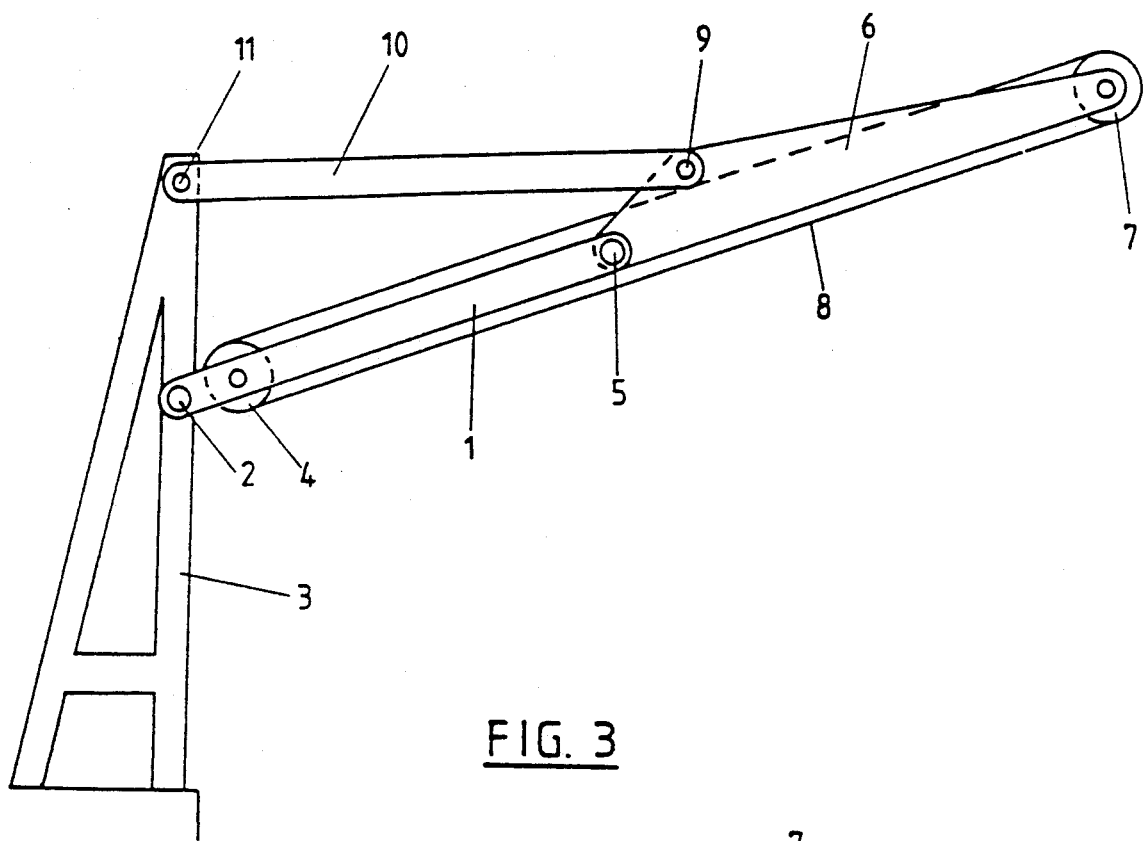
FIG. 3 shows schematically a second embodiment of foldable framework for a troughed-belt conveyor constructed according to the invention in its working position; and, FIG. 4 shows the foldable framework of FIG. 3 in its folded position.

FIG. 3 shows a similar linkage to that described above, but wherein the supporting links 10 are now located above the conveyor, so that they perform the function of ties instead of struts as described in the previous example. It will be apparent that this latter arrangement requires a taller supporting structure 3, but that the underside of the conveyor may be left unobstructed.

Figure 4:
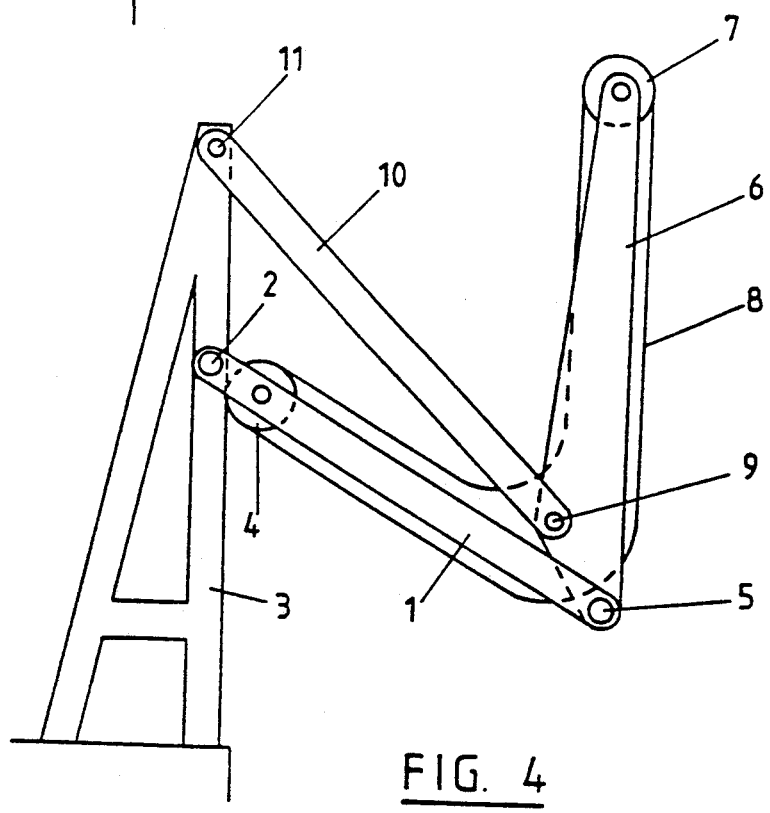

FIG. 4 shows the conveyor of FIG. 3 in its folded position. As in the previous example, the tail conveyor frame 1 has been moved (by means of the actuator not shown) to a downwardly sloping attitude whilst the head conveyor frame 6 has been constrained by the link(s) 10 to move to a substantially upright attitude.

It will be apparent that, because the conveyor sections 1 and 6 are located on the outside of the supporting links 10 in the second arrangement, longer conveyor sections 1 and 6 may be used within the same folded space envelope.

I claim:

1. An endless conveyor having a foldable framework and which comprises:
   a supporting structure;
   a tail conveyor framework which is hingedly connected at one end to the supporting structure;
   a head conveyor framework hingedly connected to the other end of the tail conveyor framework;
   tail and head conveyor drums mounted on the tail and head conveyor frameworks respectively, and around which an endless belt is taken; and,
   at least one supporting link hingedly connected at one end to the supporting structure and at its other end to the head conveyor framework at a point adjacent to the hinged connection of the tail conveyor framework to the head conveyor framework;
   in which the supporting structure, the tail conveyor framework, the head conveyor framework and the supporting link form a four-bar type linkage having proportions arranged so that when the two conveyor frameworks are aligned end to end, they are constrained to slope upwardly; and an actuator is coupled with the linkage and is operable to alter the angular relationships between adjacent members of the linkage in order to adjust the foldable structure between an operative condition of the endless conveyor and a folded inoperative position suitable for transport of the endless conveyor form an adjustable 4-bar type linkage having proportions arranged to enable the two conveyor frameworks to be adjusted between an operative position of alignment end to end in which the frameworks are constrained to slope upwardly, and a folded inoperative position suitable for transport of the endless conveyor.

2. An endless conveyor according to claim 1, in which the tail conveyor framework (1) and the head conveyor frame (6) slope upwardly at an angle of between 10° and 30° to the horizontal when in the operative position.

3. An endless conveyor according to claim 1 in which the supporting link is mounted on the supporting structure below the hinged connection (2) of the tail conveyor framework (1) to the supporting structure (3), so as to operate as a compression strut.

4. An endless conveyor according to claim 1, in which the supporting link is mounted on the supporting structure (3) above the hinged connection (2) of the tail conveyor framework (1) to the supporting structure (3), so as to operate as a tension link.

5. An endless conveyor according to claim 1, in which the endless belt (8) taken around the tail and head conveyor drums (4, 7) is of a type suitable to enable the endless conveyor to operate as a troughed belt conveyor.

* * * * *